Oct. 25, 1960     M. W. ROSCOE ET AL     2,957,293
CORN HARVESTER

Filed Sept. 27, 1956     3 Sheets-Sheet 1

INVENTORS
M. W. ROSCOE
R. L. BELDIN
BY
ATTORNEYS

Oct. 25, 1960  M. W. ROSCOE ET AL  2,957,293
CORN HARVESTER
Filed Sept. 27, 1956  3 Sheets-Sheet 2

INVENTORS
M. W. ROSCOE
R. L. BELDIN
ATTORNEYS

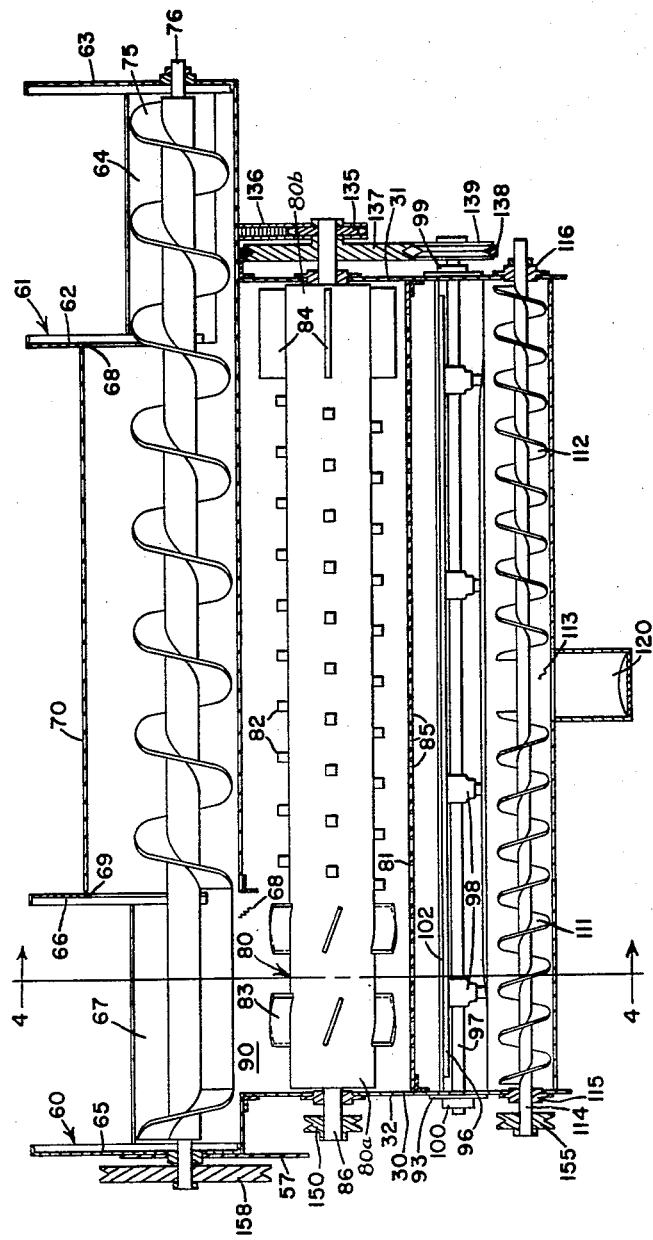

United States Patent Office 2,957,293
Patented Oct. 25, 1960

2,957,293
CORN HARVESTER

Merrill W. Roscoe, Moline, Ill., and Royal L. Beldin, Davenport, Iowa, assignors, by mesne assignments, to Deere & Company, a corporation of Delaware Filed Sept. 27, 1956, Ser. No. 612,502

6 Claims. (Cl. 56—18)

This invention relates to a corn harvester and more particularly to the type of harvester which incorporates the use of a shelling mechanism as a part thereof.

In the picker-sheller type of corn harvester one of the primary problems arising is to fully utilize the capacity of the sheller portion of the unit. In fields where there is extremely heavy yields, or in which the fields are spotty does this problem particularly arise. In these situations, there will occur surges of ears of corn moving into the shelling unit upon the picking or harvesting mechanism moving into a heavily yielded area of the field. It is necessary therefore to provide a shelling unit with sufficient capacity to shell even the most heavily yielded portions of the field. However, in providing for a higher capacity corn sheller there is created a further problem concerning the overall weight of the implement. This latter problem is particularly acute on the tractor mounted type of implement. Normally in this type of implement the shelling mechanism is mounted toward the rear of the tractor which may, if the shelling unit is extremely heavy create an overbalanced condition at that point. It is, therefore, desirable that the shelling mechanism remain as simple and light-weight as possible while retaining a capacity to shell all the corn being picked by the harvesting unit.

It is, therefore, the primary object of this invention to provide a picker-sheller type corn harvester, the shelling mechanism of which is of simple construction but which is highly efficient in utilizing the entire shelling capacity of the mechanism.

It is a further object of this invention to provide in the above shelling mechanism a conveyor mounted in the shelling mechanism which operates to receive the ears of corn from one row unit of a two row picker and transfer them to the opposite side of the shelling mechanism where they are discharged into the shelling system along with the ears of corn being discharged from the other row unit. The shelling cylinder will extend from one side of the tractor to the opposite side and the ears of corn will flow from one end of the cylinder to the opposite end thereby creating an even flow of corn with the maximum amount of shelling area being available to remove the kernels from the ears.

It is a further object of this invention to provide in the shelling mechanism means for feeding the ears of corn to the shelling cylinder so that the ears of corn will be fed under the shelling cylinder thereby moving the ears from the feeding area with the greatest dispatch.

Other objects and advantages of the invention will become apparent to those skilled in the art as the nature of the invention is understood from the following detailed description as illustrated in the accompanying drawings.

Fig. 5 is a sectional view taken along the line 5—5 of Fig. 4.

Figure 1:
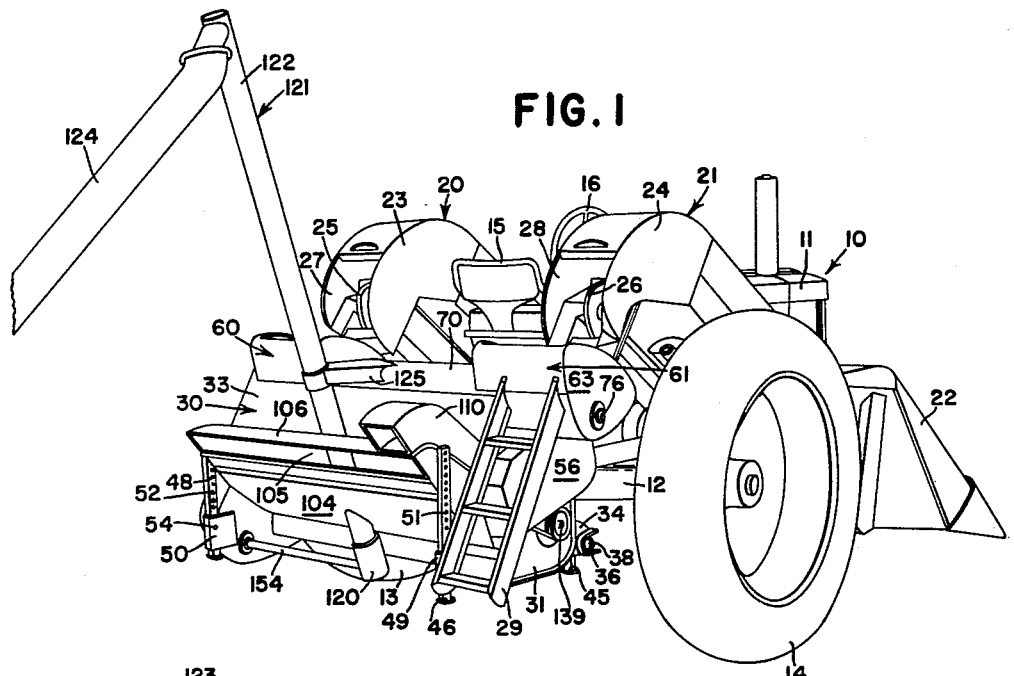
Fig. 1 is a rear and side perspective of a tractor and a picker-sheller type of corn harvester which incorporates the principles of the present invention.

The corn harvesting mechanism here shown and described is a two row type similar in many details to that shown in U.S. Patent 2,622,382 issued to W. E. Slavens, December 23, 1952. The harvester is mounted on a tractor 10 serving as a main mobile frame for the harvester and having an elongated body 11 and a transverse axle structure 12, and supported at its front by front steerable wheels, not shown, and at its rear by a pair of transversely spaced traction wheels 13 and 14. Provided on the tractor 10 is an operator's station indicated by a tractor seat 15 and a steering wheel 16. Other operating mechanism such as a power take-off shaft, not shown, is of conventional design, details not being necessary for a full understanding of the present invention.

The corn harvester includes a pair of row units 20, 21 mounted on opposite sides of the elongated body 11, each row unit having a fore end, as at 22, on the right row unit, which is positioned forwardly of the transverse axle means 12 of the tractor and which is positioned to receive the row of corn stalks as the harvester and tractor moves forwardly over the field of corn. The row units 20, 21 have transversely spaced apart rear portions 23, 24 respectively which are spaced vertically from the axle structure 12 and to the rear of the axle structure. In the fore end of the harvesting units are harvesting means for removing the ears of corn from the stalks. The latter means is of the conventional type including a pair of longitudinally extending snapping rolls which draws the stalks downwardly through them but restricts the ears of corn from passage, thereby severing the ears. The rear portions 23, 24 of the harvesting units include husking mechanism through which the ears of corn are fed following their detachment from the stalk. Conveyors, portions of which are shown at 25 and 26, operate to move the ears of corn over the husking mechanism and to discharge the ears through the openings 27, 28 at the rear portions of the row units 20, 21. The harvesting units have been described only generally, it being felt that further detail is not necessary to fully understand the principles of the present invention. However, if desired, details of the harvesting structure may be obtained in the aforesaid Slavens patent.

The shelling unit includes an elongated housing structure 30 transverse to the direction of travel and comprising triangular shaped end panels or sections 31 and 32 interconnected by transverse housing panels, such as at 33. Supported on the housing structure is a ladder 29 for use in mounting and dismounting from the operator's station. Connected to the housing structure 30 are a pair of lower transversely spaced brackets 34, 35 which extend forwardly from the housing structure at opposite ends thereof and have at their forward ends clevis type connections 36, 37 respectively for receiving a transverse tubular bar 38 which may be fixed to the tractor drawbar. Drop pins 39, 40 serve to prevent escape of the bar 38 from the clevis connections 36, 37. An upper bracket 41 is provided on the housing structure and receives an upper link, not shown, of a conventional type draft linkage on the tractor. Also provided on the housing structure are four standards or legs 45, 46, 47, and 48. The rear standards 46, 48 are mounted on the housing by means of brackets 49, 50 which are welded to and extend rearwardly from the respective end panels 31, 32 and form a vertical elongated eyelet in which the respective standards 46, 48 may slide vertically. The standards 46, 48 are provided with a series of vertically spaced apart openings 51, 52 respectively which may be aligned with apertures 53 and 54 in the brackets 49 and 50 so as to extend a pin through them for locking the legs or standards 46, 48 at any desired vertical position relative to the housing 30. The forward standards 45, 47 are supported on the housing in a manner somewhat similar to the rear standards 46, 48 with the exception that the brackets supporting the standards 45, 47 are integral with the forwardly extending brackets 34, 35, the brackets 34, 35 being bifurcated brackets with the cross pieces between the furcations being at the front and rear of the standards 45 and 47. The standards 45 and 47 may be adjusted vertically in a manner similar to, but not shown, the adjustments for standards 46 and 48.

A pair of transversely spaced ear inlets in the form of hoppers 60 and 61 are on the housing structure 30 and are positioned directly under the discharge ends of the row units 20 and 21, respectively, to receive the ears of corn being discharged by the conveyors 25 and 26. The right hopper 61 is composed of upright walls 62, 63 and an arcuate shaped bottom 64. The left hopper 60 is composed of upright walls 65, 66 and an arcuate shaped bottom panel 67 which has an opening therein to permit ears of corn to pass into the shelling mechanism. The upright walls 62 and 66 have rectangular shaped openings 68 and 69 respectively, the upper and side edges of which are connected by a transverse housing member 70.

A transverse conveyor here in the form of an auger 75 extends from the outer wall 63 of the right hopper 61 to the opening 69 in the upright wall 66. The bottom panel 64 of the right hopper extends under the auger 75 and serves as part of the auger housing. The auger 75 is mounted on a drive shaft 76 which is journaled at opposite ends on the outer walls 63 and 65 of the respective hoppers. As may be seen from Fig. 5 the right hopper 61 empties into the right end of the auger 75 and the auger 75 operates to move the material to the left side of the housing structure 30 where it empties into and is mixed with the material leaving the left row unit 20. Consequently ears of corn from both of the row units enter the shelling mechanism at the left end and under the left hopper 60.

Figure 4:
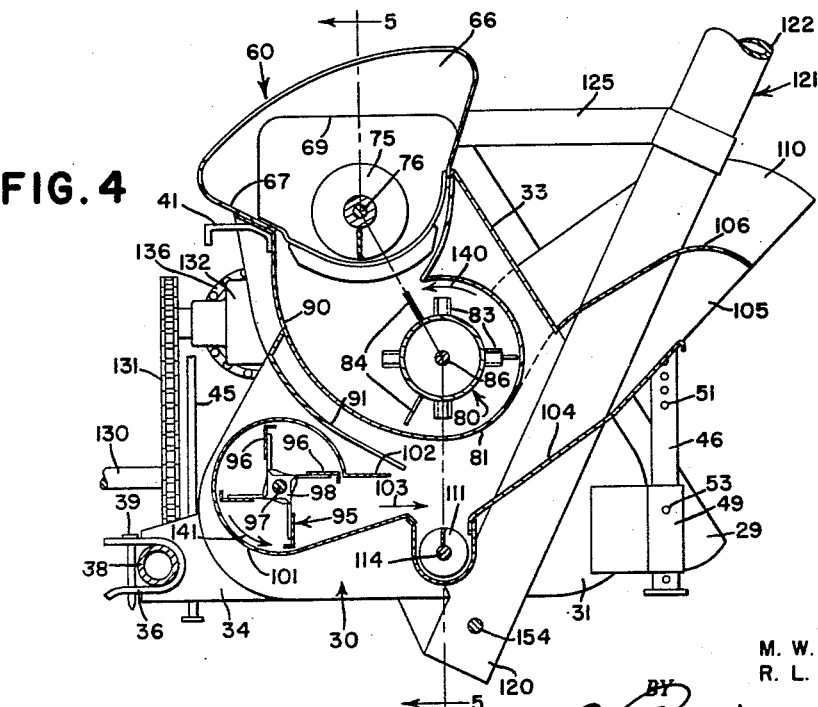
Fig. 4 is a sectional view taken along the line 4—4 of Fig. 5.

The shelling mechanism comprises basically a shelling cylinder 80 and a cooperating screen or grille 81. The shelling cylinder consists of a steel wall casing onto which is welded a series of hardened steel lugs 82. These lugs are arranged in spirals diagonally on the cylinder. The left end 80a of the cylinder 80 is provided with a series of arcuately shaped ear engaging elements or feeder lugs 83 which are positioned in fore-and-aft alignment with the hopper 60 so as to receive the material leaving the hopper 60 and the auger conveyor 75. The opposite or right end 80b of the cylinder 80 is provided with rigid and radially extending paddles 84. The paddles 84, as will later become apparent, operate to kick or to remove the cobs from the shelling mechanism. The screen or grille 81 is provided with openings 85 which permit the kernels of corn shelled from the ears to pass downwardly. The cylinder 80 is supported by a shaft 86 the opposite ends of which are journaled in the end panels 31 and 32. It will be noted, viewing Fig. 4, that the axis of the drive shaft 86 is substantially to the rear of the axis of the drive shaft 76 and also to the rear of the opening in the base of the hopper 60. This permits the ears of corn to leave the hopper 60 and auger 75 forwardly of the shelling cylinder 80. An arcuate shaped guide plate 90 operates to move the ears under the cylinder 80 so as to cause the guide lugs 83 to move downwardly on the ears to start the movement of the ears transversely to the opposite end of the cylinder. This latter feature causes the ears to flow evenly under the feeder lugs 83 and tends to eliminate clogging of the ears as they descend from the hopper 60. A panel 91 is provided under the forward half of the grille structure 81 to move the kernels shelled from the ears into a more desirable discharge area.

Blower means is provided in the shelling unit and is in the form of a rotary fan 95. The fan is comprised of transversely extending fan blades 96 which extend substantially the length of the housing, and are supported on a shaft 97 by means of axially spaced apart supports 98. The shaft 97 is supported on the end panels 31, 32 by means of suitable bushings 99 and 100, the bushing 100 being supported on a bracket 93 fixed to the left end panel 32 across an air intake opening 94 in that panel. The fan 95 is provided with a blower housing 101 which extends the length of the housing structure, is fixed to the end panels 31 and 32, and surrounds the fan 95 with the exception of the opening for a transverse discharge spout 102 which directs a blast of air across the kernels of corn passing through the cage or grille structure 81. The blast of air moves in the direction of the arrow 103 (Fig. 4) and is directed upwardly by a panel 104 to a blower discharge opening 105 at the rear of the shelling structure. An upper transverse panel 106 operates to direct the blast downwardly and through the opening 105. A cob discharge duct 110 is provided at the right end of the shelling mechanism and opens into the shelling cage at a point in fore-and-aft alignment with the paddles 84.

Positioned beneath the grille or cage structure 81 are a pair of axially aligned augers 111 and 112 which feed from the outer ends of the housing structure 30 inwardly to a central discharge area 113. The augers 111 and 112 are mounted on an auger drive shaft 114 which in turn is supported in the end panels 31, 32 by bushing elements 115, 116. The conveyor 111 has a right hand screw and the conveyor 112 has a left hand screw and they both operate upon rotation of the shaft 114 to move material inwardly to the central discharge area 113.

Positioned beneath the discharge area 113 is an intake end 120 of a discharge elevator 121. The elevator 121 includes an elongated tubular member 122 in which is mounted an auger type conveyor 123. The elevator operates to move material upwardly to a discharge spout 124 which then directs the material to an awaiting receptacle. A support 125 extends from the housing structure rearwardly to the tubular member 122 to offer support to the central area of the tubular member.

Figure 2:
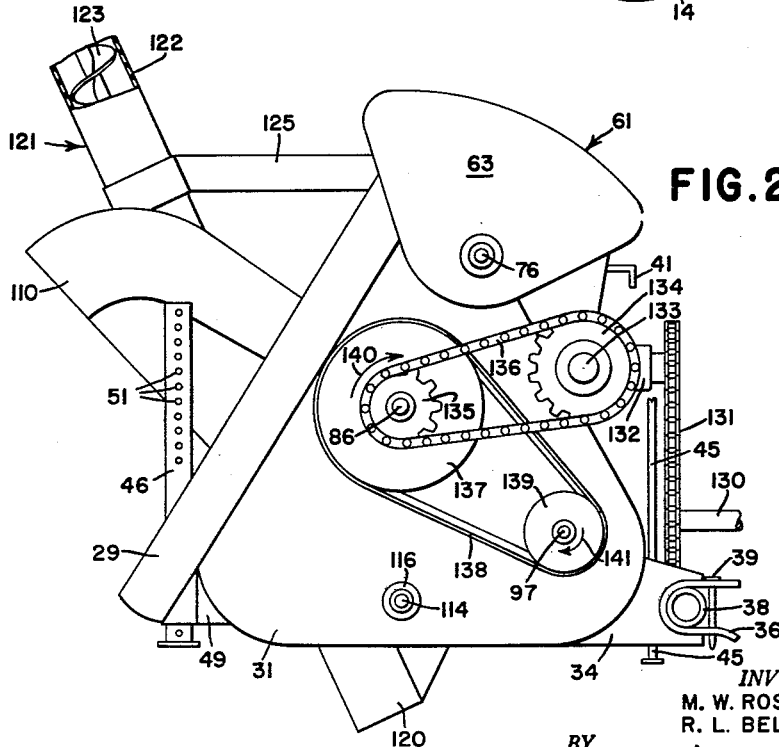
Fig. 2 is a right side or end view of the shelling unit.
Figure 3:
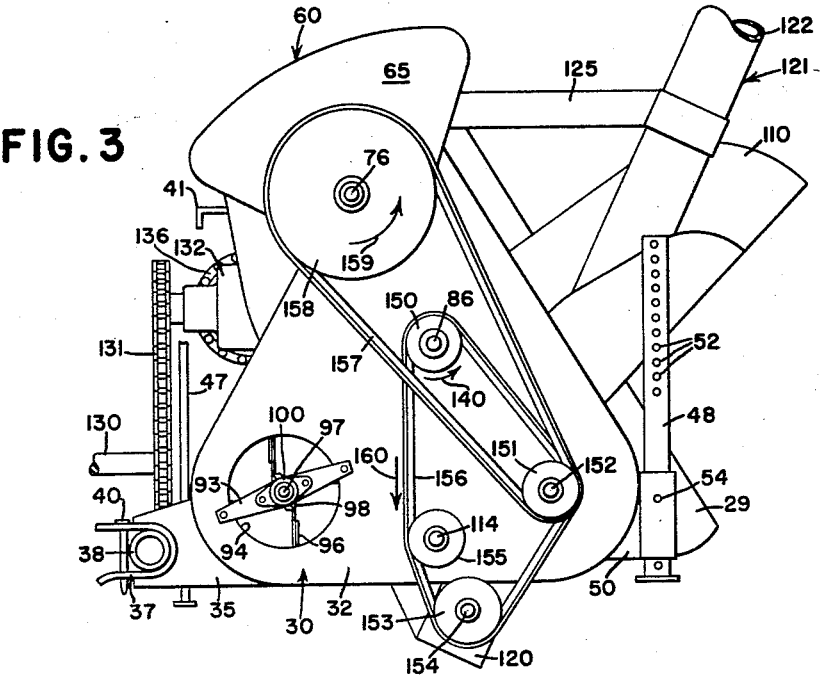
Fig. 3 is a left end or side view of the shelling unit.

Drive means for the sheller unit comprises a main drive shaft 130 connected by conventional means to the power take-off shaft, not shown, of the tractor. The main drive shaft operates through a chain and sprocket drive 131 and a gear transmission, shown in its entirety by the reference numeral 132, to drive a transverse drive shaft 133 and a sprocket 134 attached thereto. A sprocket 135 is fixed to the shelling cylinder drive shaft 86 and is driven from the transverse drive shaft 133 by means of a chain 136. Also on the right end of the shaft 86 is provided a V-belt drive composed of a pulley 137 affixed to the shaft 86, a V-belt 138, and a pulley 139 fixed to the blower drive shaft 97. Viewing Fig. 2 the direction of rotation of the shaft 86 is indicated by the arrow 140 and the direction of rotation of the shaft 97 in the direction of the arrow 141. On the left end of the drive shaft 86 outward of the end panel 32 is a V-belt drive which includes a pulley 150 fixed to the shaft 86, a pulley 151 fixed to a jackshaft 152, a pulley 153 fixed to an elevator drive shaft 154, a pulley 155 fixed to the auger drive shaft 114, and a V-belt 156 which is threaded over the pulleys. The pulley 151 on the jackshaft 152 has two grooves in it, one to receive the V-belt 156 and the other to receive a second V-belt 157 which operates to drive a pulley 158 mounted on the auger drive shaft 76. Viewing Fig. 3, arrows 140, 159 and 160 indicate the direction of movement of the pulleys 150 and 158, and the V-belt drive 157, respectively.

The elevator drive shaft 154 extends from a position outward of the panel 32 to a gear transmission, not shown, but located in the lower end 120 of the discharge elevator 121. The gear transmission is of a bevel gear type and operates to rotate the auger 123 in the elevator housing 122.

In operation the corn harvester operates in the following manner. As the harvester moves over the field of row planted corn stalks, the stalks will enter into the gathering or fore ends 22 of the row units. The harvesting mechanism in the row unit will then remove the ears from the stalks and move them rearwardly into the husking mechanisms to be discharged by the conveyors 25 and 26 into the hoppers 60 and 61, respectively. The hopper 60 will permit the ears of corn received from a left row unit 20 to descend directly onto the feeder lugs 83 of the shelling cylinder 80. The auger 75 will operate to move the ears of corn from the hopper 61 transversely to the opposite side of the shelling unit where they will be discharged into the shelling mechanism. As may be seen from Fig. 4 the auger 75 and the hoppers 60 and 61 are positioned forwardly of the shelling cylinder 80 thereby permitting the ears of corn to gravitate forwardly of the shelling cylinder 80 to be guided by the guide plate 90 to a position under and tangential with the cylinder. The feeder lugs or ear engaging elements 83 moving downwardly onto the ears will then drive the ears axially inwardly to a position under the lugs 82 on the cylinder 80. The action of the lugs 82 against the ears, shells the corn and propels the cobs to the discharge end of the cylinder where the cob discharge paddles 84 strike the cobs and drives them upwardly and through the discharge duct 110, there to be discharged onto the ground. It should here be noted that by transferring the ears from the hopper 61 to a position on the opposite side of the shelling unit or to a position directly beneath the hopper 60, the shelling operation may occur the entire width of the shelling unit or precisely the length of the shelling cylinder 80. This latter feature prevents clogging at the intake end of the shelling cylinder and also provides for a relatively smooth flow of the ears through the shelling mechanism.

The kernels of corn shelled from the ears gravitate through the openings 85 in the screen 81. The plate 91 and the panel 104 collects the kernels passing through the screen 81 and directs them downwardly to the augers 111 and 112. The blast of air issuing from the fan 95 traverses the kernels of corn and separates incidental trash such as silk, husk particles, and other foreign matter and blows it outwardly through the opening 105. The augers 111 and 112 move the kernels of corn inwardly to the central position 113 where they are discharged into the lower end 120 of the discharge elevator 121. The discharge elevator 121 and spout 124 direct the kernels into an awaiting vehicle preliminary to storage.

While only one form of the invention has been shown it should be recognized that other forms and variations could exist without departing basically from the broad general principles herein disclosed. It should, therefore, be understood that while the preferred form has been described with the view of clearly and concisely illustrating the principles, it is desired not to so limit or narrow the invention beyond that which is claimed.

What is claimed is:

1. A corn sheller comprising: elongated housing structure having transversely spaced apart end sections and a pair of ear inlets at the respective end sections; a shelling mechanism including an elongated shelling cylinder and associated grille structure extending substantially the length of the housing structure and having opposite ends thereof proximate to the respective end sections of the housing structure and operative to move the ears from one end to the opposite end as the corn is shelled from the ears, the cylinder being mounted in the housing structure rearwardly of and under the ear inlets and having peripheral ear-engaging elements, and being rotatable about a transverse axis to move the elements forward of the axis downwardly and the elements to the rear of the axis upwardly; an ear conveyor supported in the housing above the cylinder having an ear intake end at one of said inlets and an ear discharge end at the other inlet for mingling ears from both inlets proximate to said other inlet and said one end of the shelling mechanism; panel means supported by the housing structure adjacent said other inlet for extending upwardly and forwardly from the under side of the cylinder for guiding ears downwardly and rearwardly to effect feeding of the ears under the downwardly moving elements and between the cylinder and the associated grille structure; trash discharge means at said opposite end of the shelling mechanism discharging cobs and trash from the housing structure; blower means forwardly of and supported by the housing structure beneath the grille structure issuing a blast of air rearwardly traversing the corn passing through the grille structure for removing incidental trash remaining with the corn; and corn discharge means on the housing structure collecting and moving the shelled corn from the shelling unit.

2. A corn sheller comprising: elongated housing structure having transversely spaced apart end sections and a pair of ear inlets at the respective end sections; a shelling mechanism including an elongated shelling cylinder and associated grille structure extending substantially the length of the housing structure and having opposite ends thereof proximate to the respective end sections of the housing structure and operative to move the ears from one end to the opposite end as the corn is shelled from the ears, the cylinder being mounted in the housing structure rearwardly of and under the ear inlets and having peripheral ear-engaging elements, and being rotatable about a transverse axis to move the elements forward of the axis downwardly and the elements to the rear of the axis upwardly; an ear conveyor supported on the housing structure above the cylinder and having an ear intake end at one of said inlets and an ear discharge end at the other inlet for mingling ears from both inlets proximate to said other inlet and said one end of the shelling mechanism; and panel means on the housing structure adjacent said other inlet extending upwardly and forwardly from the underside of the cylinder for guiding ears downwardly and rearwardly to effect movement of the ears under the downwardly moving elements and between the cylinder and the associated grille structure.

3. A corn shelling unit for use with a corn harvester having a mobile frame and transversely spaced row units mounted thereon for harvesting adjacent rows of corn as the harvester moves forwardly with rearwardly positioned and transversely spaced ear discharge outlets, said corn shelling unit comprising: a transverse housing structure mounted on the frame rearwardly of the row units and having transversely spaced ear inlets at opposite ends thereof opening upwardly to receive ears from the respective discharge outlets of the row units; a transverse shelling mechanism effective to shell the ears and to move the ears from one to the other end of the housing structure including an elongated shelling cylinder and associated grille structure extending substantially the transverse length of the housing, the cylinder being mounted in the housing structure rearwardly of and under the ear inlets and being rotatable in a direction to effect downward movement of its forward side, a transverse ear conveyor within the housing forwardly and above the cylinder having an ear receiving end at one of said inlets and an ear discharge end at the other ear inlet for mingling ears from both inlets proximate said other inlet; panel means supported by the housing structure at the base of said other inlet and extending upwardly and forwardly from the underside of the cylinder for effecting movement of the ears downwardly and rearwardly under one end of the cylinder and generally in the direction of rotation of the underside of the cylinder; trash discharge means at the opposite end of the shelling mechanism discharging cobs and trash from the housing structure; transverse conveying means under the shelling mechanism moving shelled corn centrally and having a central discharge area; and a discharge elevator for moving the corn from the discharge area.

4. A corn shelling unit for use with a corn harvester having a mobile frame and transversely spaced row units mounted thereon for harvesting adjacent rows of corn as the harvester moves forwardly with rearwardly positioned and transversely spaced ear discharge outlets, said corn shelling unit comprising: a transverse housing structure mounted on the frame rearwardly of the row units and having transversely spaced ear inlets at opposite ends thereof opening upwardly to receive ears from the respective discharge outlets of the row units; a transverse shelling mechanism effective to shell the ears and to move the ears from one end to the other end of the housing structure including an elongated shelling cylinder and associated grille structure extending substantially the transverse length of the housing, the cylinder being mounted in the housing structure rearwardly of and under the ear inlets and being rotatable in a direction to effect downward movement of its forward side, a transverse ear conveyor supported in the housing forwardly and above the cylinder having an ear receiving end at one of said inlets and an ear discharge end at the other ear inlet for mingling ears from both inlets proximate said other inlet; panel means supported by the housing structure adjacent said other inlet and extending upwardly and forwardly from the underside of the cylinder for effecting movement of the ears downwardly and rearwardly under one end of the cylinder and generally in the direction of rotation of the cylinder; and blower means carried by the housing structure forwardly of and beneath the grille structure issuing a rearwardly directed blast of air traversing the corn passing through the grille structure for removing incidental trash remaining with the corn.

5. A corn shelling unit for use with a corn harvester having a mobile frame and transversely spaced row units mounted thereon for harvesting adjacent rows of corn as the harvester moves forwardly with rearwardly positioned and transversely spaced ear discharge outlets, said corn shelling unit comprising: a transverse housing structure mounted on the frame rearwardly of the row units and having transversely spaced ear inlets at opposite ends thereof opening upwardly to receive ears from the respective discharge outlets of the row units; a transverse shelling mechanism effective to shell the ears and to move the ears from one end to the other end of the housing structure including an elongated shelling cylinder and associated grille structure extending substantially the transverse length of the housing, the cylinder being mounted in the housing structure rearwardly of and under the ear inlets and being rotatable in a direction to effect downward movement of its forward side, a transverse ear conveyor supported in the housing forwardly and above the cylinder having an ear receiving end at one of said inlets and an ear discharge end at the other ear inlet for mingling ears from both inlets proximate said other inlet; and panel means supported by the housing structure at the base of said other inlet and extending upwardly and forwardly from the underside of the cylinder for effecting movement of the ears downwardly and rearwardly under one end of the cylinder and generally in the direction of rotation of the cylinder.

6. A corn shelling unit for use with a corn harvester having a mobile frame and transversely spaced row units mounted thereon for harvesting adjacent rows of corn as the harvester moves forwardly with rearwardly positioned and transversely spaced ear discharge outlets, said corn shelling unit comprising: a transverse housing structure mounted on the frame rearwardly of the row units and having transversely spaced ear inlets at opposite ends thereof opening upwardly to receive ears from the respective discharge outlets of the row units; a transverse shelling mechanism effective to shell the ears and to move the ears from one end to the other end of the housing structure including an elongated shelling cylinder and associated grille structure extending substantially the transverse length of the housing, the cylinder being mounted in the housing structure under the ear inlets; a transverse ear conveyor supported in the housing above the cylinder having an ear receiving end at one of said ear inlets and an ear discharge end at the other ear inlet for mingling ears from both inlets proximate said other inlet; trash discharge means at the opposite end of the shelling mechanism discharging cobs and trash from the housing structure; transverse conveying means under the shelling mechanism moving shelled corn centrally and having a central discharge area; and a discharge elevator for moving the corn from the discharge area.

References Cited in the file of this patent

UNITED STATES PATENTS

| | | |
|---|---|---|
| 1,018,820 | Gilman | Feb. 27, 1912 |
| 1,943,284 | Binau | Jan. 16, 1934 |
| 2,518,302 | Gerber | Aug. 8, 1950 |
| 2,577,349 | Mitchell | Dec. 4, 1951 |
| 2,841,944 | Carlson et al. | July 8, 1958 |